(12) United States Patent
Cavanagh et al.

(10) Patent No.: US 7,774,638 B1
(45) Date of Patent: Aug. 10, 2010

(54) UNCORRECTABLE DATA ERROR CONTAINMENT SYSTEMS AND METHODS

(75) Inventors: Edward T. Cavanagh, Norristown, PA (US); Mehdi Entezari, Collegeville, PA (US)

(73) Assignee: Unisys Corporation, Blue Bell, PA (US)

( * ) Notice: Subject to any disclaimer, the term of this patent is extended or adjusted under 35 U.S.C. 154(b) by 410 days.

(21) Appl. No.: 11/904,489

(22) Filed: Sep. 27, 2007

(51) Int. Cl.
*G06F 11/00* (2006.01)
(52) U.S. Cl. .............................. 714/4; 714/18; 710/313
(58) Field of Classification Search ........................ None
See application file for complete search history.

(56) References Cited

U.S. PATENT DOCUMENTS

| | | | | |
|---|---|---|---|---|
| 6,049,889 | A * | 4/2000 | Steely et al. .................... | 714/4 |
| 7,356,636 | B2 * | 4/2008 | Torudbakken et al. ....... | 710/313 |
| 7,424,567 | B2 * | 9/2008 | Manula et al. ............... | 710/310 |
| 7,474,623 | B2 * | 1/2009 | Boyd et al. .................. | 370/242 |
| 7,574,551 | B2 * | 8/2009 | Gundam et al. ............. | 710/313 |
| 2005/0283641 | A1 * | 12/2005 | Clark et al. .................... | 714/4 |
| 2006/0288098 | A1 * | 12/2006 | Singh et al. .................. | 709/224 |
| 2009/0292960 | A1 * | 11/2009 | Haraden et al. ............. | 714/699 |

OTHER PUBLICATIONS

Microsoft Computer Dictionary, 4th Ed. 1999, Microsoft Press, p. 246.*

* cited by examiner

*Primary Examiner*—Christopher S McCarthy
(74) *Attorney, Agent, or Firm*—Richard J. Gregson; Robert P. Marley

(57) ABSTRACT

Methods and systems for containing data errors in a computing system are disclosed. One method includes receiving data from an endpoint at the communication interface in response to a data request. The method also includes detecting an error in the data. The method further includes ignoring subsequent data received from the endpoint.

25 Claims, 7 Drawing Sheets

UNCORRECTABLE DATA ERROR CONTAINMENT SYSTEMS AND METHODS

TECHNICAL FIELD

The present disclosure relates generally to communication systems in computing hardware; more specifically, the present disclosure relates to containment of uncorrectable data errors communicated among components in computing hardware.

BACKGROUND

In multiprocessor computing environments and other complex computing systems, large numbers of components are often organized along communication channels, which are used as system buses communicating data among the various physical components within the computing environment. The physical components can include network adapters or other communication interfaces, graphics cards, processing units, memories, or other physical subsystems.

One such high speed serial communication channel is a PCI Express system bus. PCI Express system buses require a PCI Express compatible interface associated with each component to which the bus connects. The interface sends and receives data from the system components connected to the PCI Express bus. To do so, the interface must send and receive transaction packets on the bus and manage the parallelization/serialization and routing of that data. The interface must also determine the type of transaction to be performed using header information contained in the received data, or must prepare transaction packets for other systems/interfaces to decode.

Data transmitted on the various communication channels in such computing environments is subject to errors from a variety of sources, such as a fault occurring in one of the components connected to the channel, transmission errors in the channel, or other types of errors. Error detection systems incorporated at the various bus interfaces detect errors in inbound transaction packets. Some of the errors can be corrected in hardware, and some cannot. When an uncorrectable error is detected, hardware systems generally write the erroneous data into memory, designate that data as "poisoned", and wait until that memory location is read by software. When the memory location is read by a driver or other software, the system processor issues a Machine Check Abort (MCA) event, causing the software to shutdown the entire hardware system.

In large-scale server platforms with large I/O configurations and multiple virtual operating system domains, the error may not normally affect a portion of the computing system which is shut down by the MCA event. In such systems, the unconfined error causes a shutdown of the unaffected hardware regardless of its relationship to the error-causing component. Restarting an entire system after an MCA event can be time consuming, and can deprive users of valuable computing resources.

For these and other reasons, improvements are desirable.

SUMMARY

The above and other problems are solved by the following:

In a first aspect, a method for containing data errors in a computing system is disclosed. The method includes receiving data from an endpoint at the communication interface in response to a data request. The method also includes detecting an error in the data. The method further includes ignoring subsequent data received from the endpoint.

In a second aspect, a computing system is disclosed. The computing system includes a memory configured to store data. The computing system also includes a programmable circuit operatively connected to the memory and configured to execute program instructions. The computing system includes a communication interface operatively connected to the programmable circuit and the memory. The communication interface is configured to receive data from an endpoint in response to a data request. The communication interface is further configured to detect an error in the data. The communication interface is configured to store the data in the memory. The communication interface is also configured to ignore subsequent data received from the endpoint.

In a third aspect, a computer-readable medium having computer-executable instructions for performing steps to contain data errors in a computing system is disclosed. The instructions are configured for receiving data from an endpoint at the communication interface in response to a data request. The instructions are further configured for detecting an error in the data. The instructions are also configured for ignoring subsequent data received from the endpoint.

DETAILED DESCRIPTION

Figure 1:
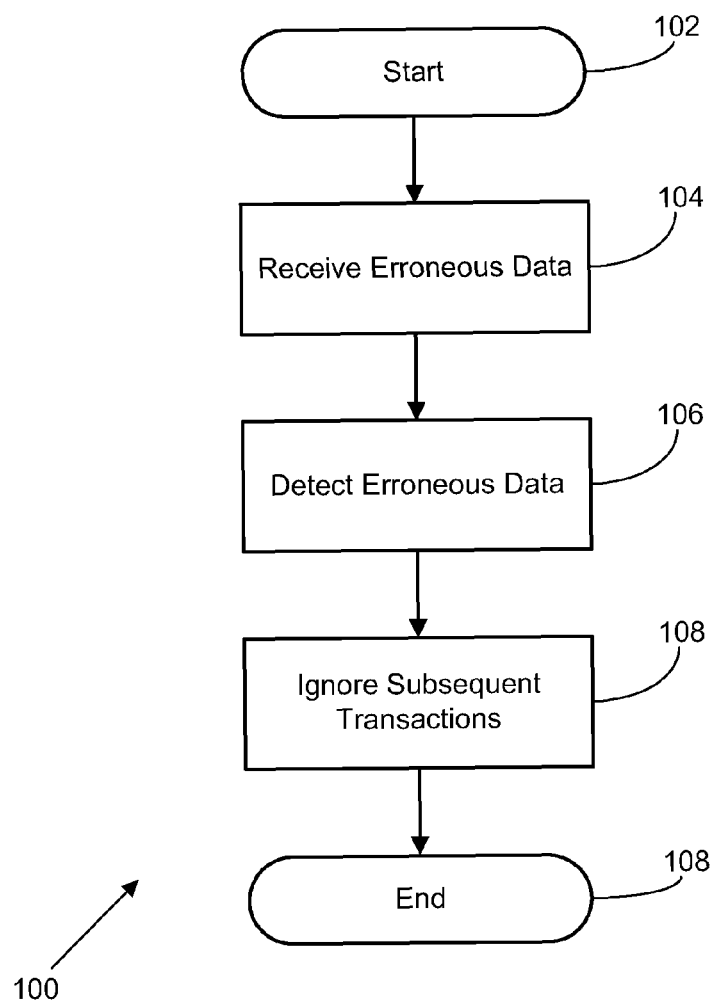
FIG. 1 is a flowchart of methods and systems for containing data errors in a computing system, according to a possible embodiment of the present disclosure.

Various embodiments of the present disclosure will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

In general, the present disclosure relates to containment of uncorrectable data errors in computing hardware. The methods and systems disclosed detect and contain data errors in computing hardware, allowing software systems or other hardware systems retry the transaction, to reset a link to the error-causing hardware, or find an alternative communication channel for the data to be sent to the error causing hardware. The methods and systems of the present disclosure allow large scale computing systems to avoid total system shutdown in the event of an uncorrectable error. The systems of the present disclosure are particularly operable in large-scale computing systems having redundant processing, communication, and memory systems, although various types of computing systems may use the methods and systems of the present disclosure as well.

Referring now to FIG. 1, a flowchart of methods and systems for containing data errors in a computing system is shown, according to a possible embodiment of the present disclosure. The system 100 disclosed illustrates operational steps performed to isolate data errors received on a communication channel which are not correctable by hardware. Such errors can occur, for example, based on a hardware failure in an endpoint, or based on failure in transmission of data on the communication channel, such as due to electrical interference. By endpoint, it is intended that any type of computing subsystem may be implemented which can receive transactions on a communication channel and respond appropriately to the transaction. Examples of typical endpoints within a large-scale computing system can include a memory subsystem, a network interface, a secondary or parallel processing system, peripheral components, or other types of subsystems.

One embodiment of the system 100 is operable in a multiple communication channel computing system implementing a PCI Express communications protocol and infrastructure. In such an embodiment, the endpoints include PCI Express compatible communication interfaces. The PCI Express specifications for PCI Express Version 1.1 and 2.0 are available at www.pcisig.com. Other systems, structures, and protocols are possible as well.

Operational flow within the system 100 instantiates at a start operation 102. The start operation 102 corresponds to initialization of a communication interface, such as a PCI Express interface. The start operation 102 can specifically relate to transmission of a data request from a communication interface to an endpoint having a complementary communication interface. Other data requests are possible as well. Operational flow proceeds to a data receipt module 104. The data receipt module 104 receives data from an endpoint transmitted on a communication channel. The data received may be instruction or address data received in response to a read request transmitted from the communication interface, or may be data targeted to systems interconnected with the communication interface, such as a memory subsystem or programmable circuit. The data receipt module 104 optionally stores the received data in a register or memory location for evaluation by the communication interface or processing system implementing the module.

Operational flow proceeds to an error detection module 106. The error detection module 106 detects errors in the data received in the data receipt module 104. The error detection module 106 performs an error detection operation on received transaction packets on the communication channel. In one embodiment, the error detection module 106 executes within the communication interface receiving the data, and detects errors in the contents of a transaction packet. In a further embodiment, the error detection module 106 executes in a programmable circuit interfaced with the communication interface, and detects errors within data stored in a transaction packet. Other implementations of the error detection module 106 are possible as well.

Operational flow proceeds to a subsequent transaction module 108. The subsequent transaction module 108 modifies the normal behavior of the communication interface based on the detected error in the data received on the communication channel. The subsequent transaction module 108 ignores subsequent transactions received from the same endpoint as the received data (or equivalently on the same communication channel). A number of implementations of the subsequent transaction module 108 are possible. Various of these embodiments are discussed in greater detail in conjunction with FIG. 6, below. Other embodiments are possible as well, which allow the system 100 to isolate portions of a computing system which previously provided erroneous data. Operational flow terminates at an end module 110, which corresponds to completed isolation of the error to the communication channel on which the erroneous data was transmitted.

In each of the embodiments above, it is noted that any preexisting transactions received by the communication interface from the endpoint at which the error occurs are allowed to complete. This can be accomplished, for example, by strictly ordering execution of the transaction packets after detection of an error, or by otherwise delaying the data error isolation action performed by the subsequent transaction module 108 until after all previously received transaction packets are processed. Further implementations are possible as well.

The system 100 is configured based on a number of understandings regarding the interoperation of the communication interface with various additional software and hardware. For example, operation of the system 100 assumes that, in general, software systems operating using the communication interface (i.e. operating systems, drivers, or application level programs) will be configured to obtain an indication of erroneous data from the hardware, such as by receiving an inband or out of band error message from the hardware, or by periodically polling an error status register which may indicate the existence and/or location of erroneous data in memory or by being triggered by an alert signal interrupt. The system 100 optionally also assumes that the various software and hardware systems implementing the data containment features of the present disclosure will cause the communication interface to retry the data request leading to receipt of the erroneous data. Such software generally retries the transaction one or more times, and then seeks an alternative endpoint for data communication (as described below in conjunction with FIGS. 3-4) and/or resets the established link to the error-generating endpoint, thereby allowing the operational, non-erroneous components of computing system to retry communications to the endpoint after it has been reset.

Figure 2:
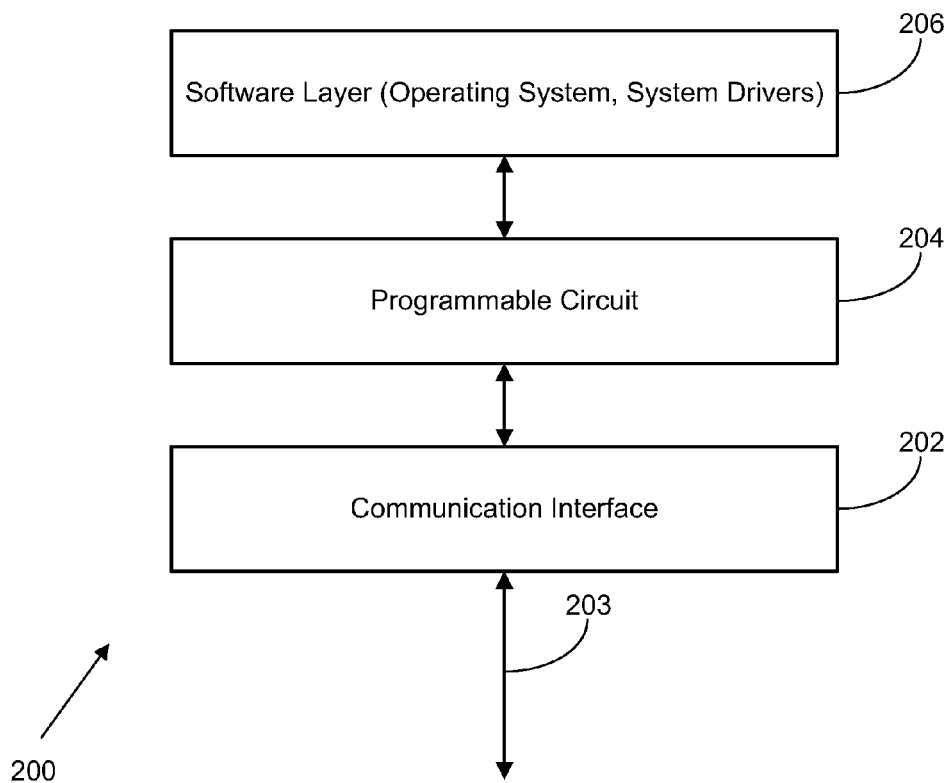
FIG. 2 is a block diagram of a hardware and software system interface according to a possible embodiment of the present disclosure.

FIG. 2 is a generalized block diagram of architectural components of a computing system 200 according to a possible embodiment of the present disclosure. The computing system 200 includes a communication interface 202, a programmable circuit 204, and a software layer 206. The computing system 200 represents a generalized computing system in which one or more of each of the components 202-206 may be present. The communication interface 202 provides an interconnection among various other components within a computing system 200, such as additional interfaces, programmable circuits, or peripheral systems, via a communication channel 203 interconnected to the interface. In one embodiment, the communication interface 202 is a PCI Express compatible interface which connects to a PCI Express channel. Other interface standards are possible as well.

The programmable circuit 204 can be any of a number of types of programmable circuits configured to execute program instructions to perform various computing functions. For example, the programmable circuit 204 can be a general purpose microprocessor or programmable logic device. Alternately, the programmable circuit can be a special purpose or limited purpose logic device configured to interface with specific mechanical hardware or external systems. Other embodiments of the programmable circuit 204 are possible as well, such as those described below in FIGS. 3-4.

The programmable circuit 204 links to the communication interface 202 by an electrical, communicative connection, such as by electrically interconnecting two integrated circuits or by forming both systems within a single integrated circuit. Other communicative connections are possible between the programmable circuit 204 and the communication interface 202 are possible as well.

The software layer 206 represents software operable directly in conjunction with the programmable circuit 204 and communication interface 202. In various embodiments, the software layer can include an operating system, various device drivers, application level programs, and other executable instructions. Multiple types of software system 206 may be used in conjunction with a single programmable circuit 204; likewise one or more types or instances of software systems 206 can be used in conjunction with multiple programmable circuits 204.

The software layer 206 may reside in a memory associated with the programmable circuit 204, and may interface with the programmable circuit 204 and other hardware by polling various hardware registers to detect the status of the programmable circuit 204, or may receive hardware-generated messages/alerts. Likewise, device drivers and operating system components in the software layer 206 may be configured to read or write data to specific portions of the programmable circuit 204, thereby directing the programmable circuit 204 to execute specific portions of software to perform various routines. Other implementations of an interface between the software layer 206 and the programmable circuit 204 are possible as well.

An example hardware configuration in which the architectural components of FIG. 2 may be present is shown and described below in conjunction with FIGS. 3-5. In such systems, the software 206 may reside on various types of communication media or in a memory associated with the programmable circuit 204, or may exist as a modulated data signal traveling along data buses or communication channels within the system 200. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Figure 3:
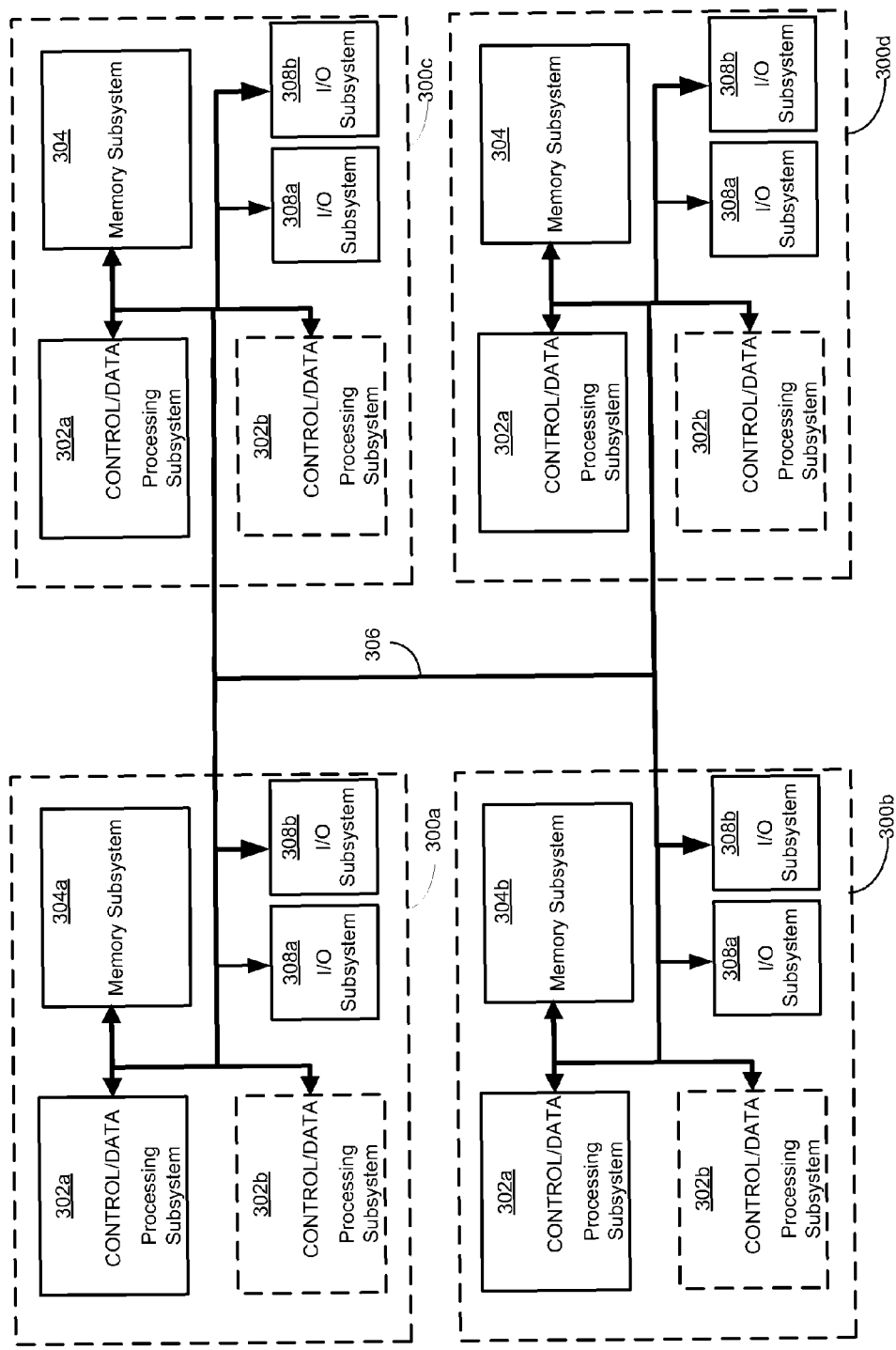
FIG. 3 is a block diagram of a computing environment in which various aspects of the present disclosure may be implemented.

FIG. 3 is a block diagram of a multiprocessing system in which aspects of the present disclosure may be implemented. The multiprocessing system shown can, in certain embodiments, include the programmable circuit 204 and communication interface 202 of FIG. 2. The multiprocessing system includes a plurality of programmable circuits 300a-d. Each of the programmable circuits 300a-d corresponds to one or more sockets, cells or other computing subsystems which may be provided in a common physical or logical package. The programmable circuits 300a-d each include a plurality of processing subsystems 302a, 302b, and a memory subsystem 304, which are interconnected via a communication channel 306. Additional I/O subsystems 308a-b, such as communication interfaces of various types, can be interconnected via the communication channel 306 as well. Furthermore, the programmable circuits 300a-d are interconnected via the communication channel 306.

Figure 4:
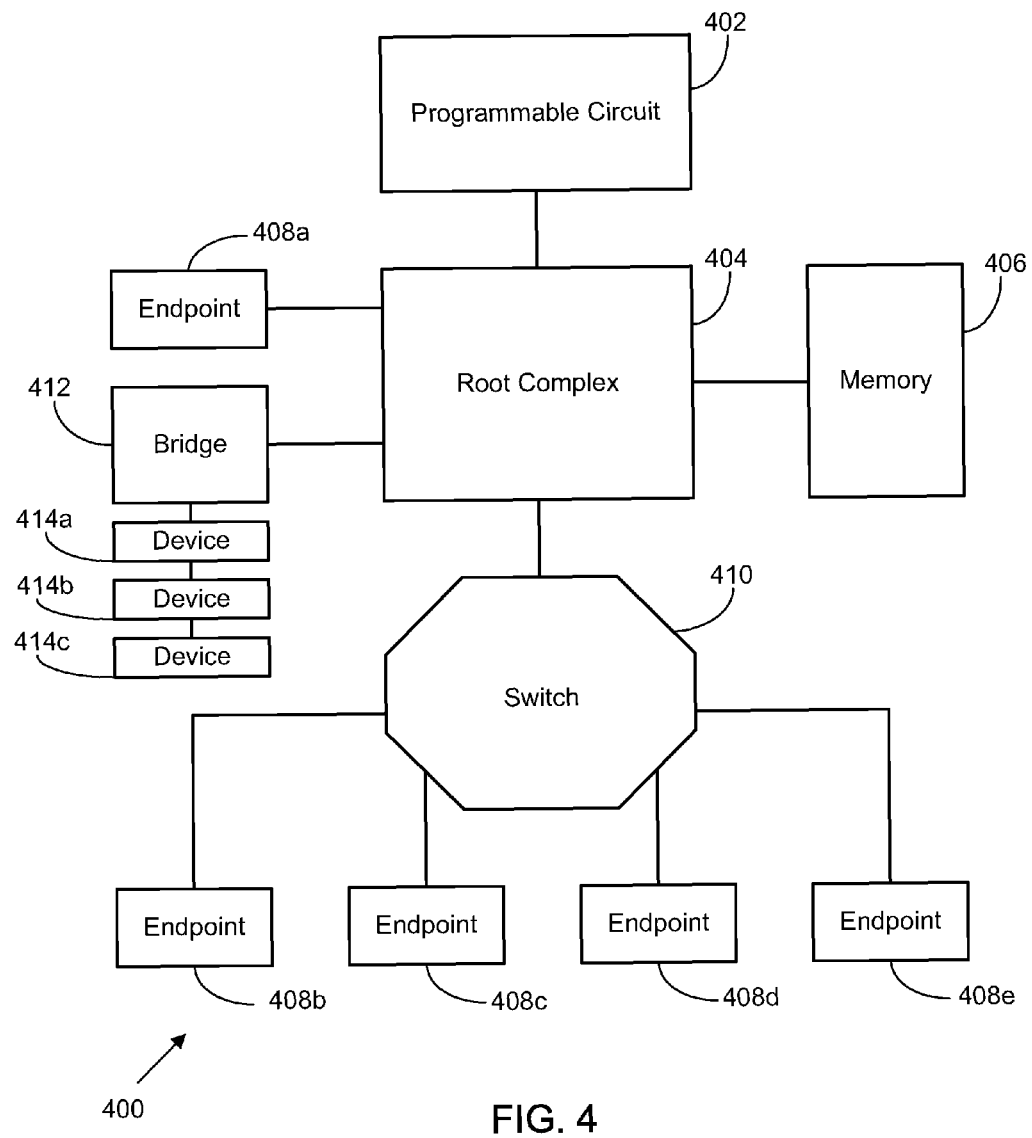
FIG. 4 is a block diagram of a cell in a computing environment of FIG. 3.
Figure 5:
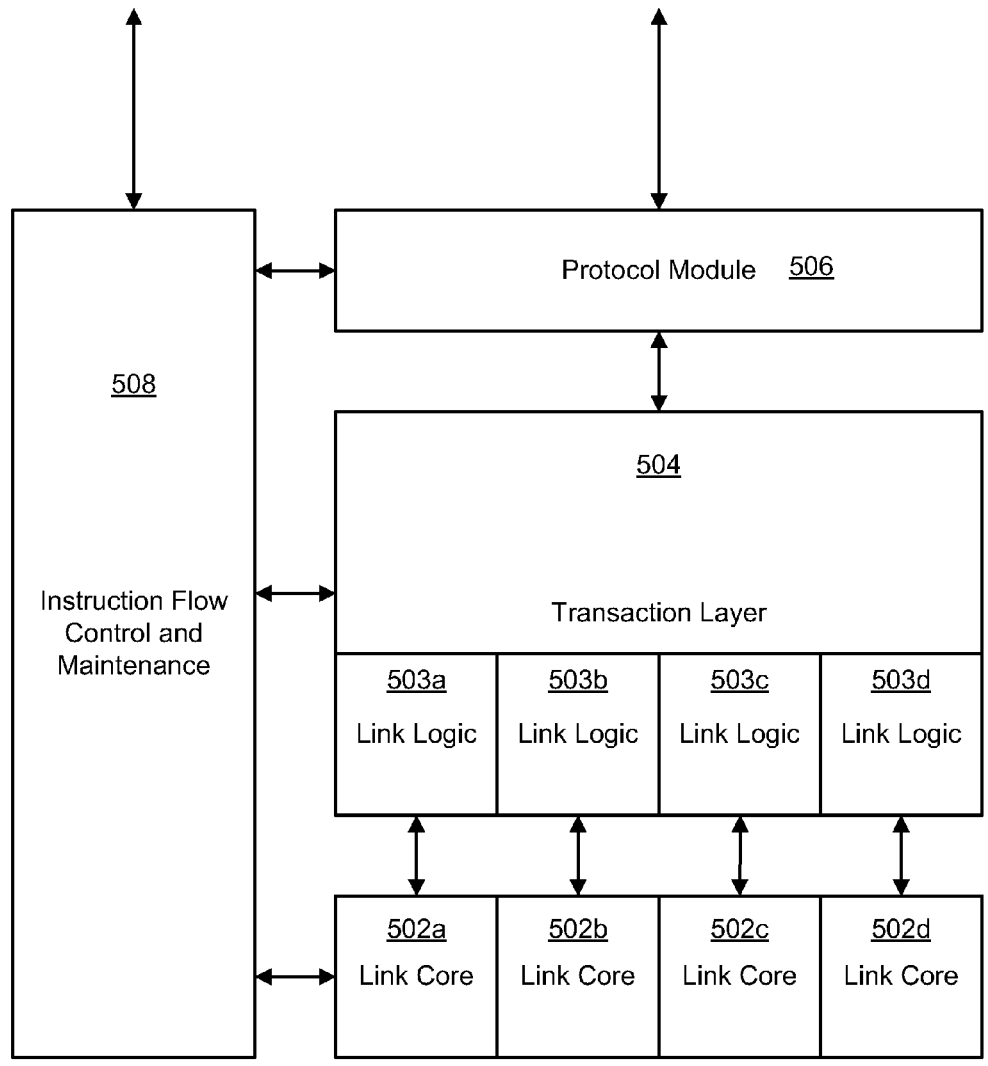
FIG. 5 is a block diagram of a root complex useable in the block diagram of FIG. 4.

Optional bus controllers (as shown in FIGS. 4-5 below) interconnect the programmable circuits 300a-d or components 302a-b, 304, and 308 within each circuit 300. In various embodiments of the multiprocessing system 400, the communication channel 306 may be implemented using a set of point-to-point serial connections between modules 302 within each programmable circuit 300, a set of point-to-point serial connections between circuits 300, and a set of connections between circuits and one or more system memory modules 304. In such embodiments, the transaction packet processing techniques described herein may be performed by logic implemented in the programmable circuits 300a-d, or may be implemented within each subsystem 302, 304, or 308 within the programmable circuits.

The programmable circuits 300a-d may be implemented as a socket or cell system according to various embodiments of the present disclosure. A socket or cell is a set of one or more processors with associated cache memory modules used to perform various processing tasks. These associated cache modules may be implemented as a single level cache memory and a multi-level cache memory structure operating together with a programmable processor. I/O Subsystems 308a-b are connected for use by any tasks executing within the multiprocessing system, and may be connected to the socket or cell by a communication interface, as shown in FIG. 4, below.

While in certain embodiments the programmable circuits 300a-d are depicted as similar, one of ordinary skill in the art will recognize that each circuit may be individually configured to provide a desired set of processing resources as needed.

The processing subsystems 302a, 302b can be any of a number of processing units, programmable logic devices, or other programmable systems configured to execute software instructions. A variety of processing units are available from a number of manufacturers, for example, Intel or Advanced Micro Devices. Although two processing subsystems 302a-b are shown in FIG. 3, more or fewer processing subsystems may be present in an overall programmable circuit 300 according to various embodiments of the present disclosure.

The memory subsystem 304 can be a system memory, cache memory associated with one or more of the processing subsystems 302a-b, or other types of memory. The system or flash memory may be integrated within or separate from another programmable circuit, and can constitute random access memory, flash memory, register memory, or other types of memory. In addition, the memory subsystem 304 may be more than one type of memory device, such as a combination of cache memory and system memory, and may include other data storage devices. The memory subsystem 304 forms a unified memory system, in that the entire memory subsystem is accessible by a single memory addressing scheme, where each address refers to a location within one or more memory devices.

In one embodiment, the memory subsystem 304 provides data caching memory structures using cache lines along with directory structures and control modules. A cache line used within a programmable circuit 300a-d may correspond to a copy of a block of data that is stored elsewhere within the address space of the multiprocessing system. The cache line may be copied into a processing subsystem's cache memory by the memory subsystem 304 when it is needed by a processing subsystem 302 of the corresponding programmable circuit 300. The same cache line may be discarded when the processing subsystem no longer needs the data. Data caching structures may be implemented for systems that use a distributed memory organization in which the address space for the system is divided into memory blocks that are part of the memory subsystems 304 distributed through the programmable circuits 300a-d. Data caching structures may also be implemented for systems that use a centralized memory organization in which the memory's address space corresponds to a large block of centralized memory of a memory subsystem 304.

The memory subsystem 304 and optional additional data control and routing logic controls access to and modification of data within cache lines held within a programmable circuit 300, as well as the propagation of any modifications to the contents of a cache line to all other copies of that cache line within the multiprocessing system. The memory subsystem 304 optionally uses a directory structure (not shown) to maintain information regarding the cache lines currently in use by a particular processor of its sockets. Other memory subsystems 304 associated with other of the programmable circuits 300a-d perform similar functions for those circuits.

The multiprocessing system of the present disclosure can contain data errors in one or more of the programmable circuits 300a-d from the other of the programmable circuits, or from non-erroneous subcomponents of the same programmable circuit. For example, an error occurring in I/O device 308 within programmable circuit 300a can be isolated from programmable circuit 300a.

One of ordinary skill in the art will recognize that additional components, peripheral devices, communications interconnections and similar additional functionality may also be included within multiprocessing system without departing from the spirit and scope of the present invention as recited within the attached claims. The embodiments of the invention described herein are implemented as logical operations in a programmable circuit, such as a computing system having connections to a distributed network such as the Internet. The system can thus serve as either a stand-alone computing environment or as a server-type of networked environment. The logical operations are implemented (1) as a sequence of computer implemented steps running on a computer system and (2) as interconnected machine modules running within the computing system. This implementation is a matter of choice dependent on the performance requirements of the computing system implementing the invention. Accordingly, the logical operations making up the embodiments of the invention described herein are referred to as operations, steps, or modules. It will be recognized by one of ordinary skill in the art that these operations, steps, and modules may be implemented in software, in firmware, in special purpose digital logic, and any combination thereof without deviating from the spirit and scope of the present invention as recited within the claims attached hereto.

Additional details regarding the multiprocessing system generally, and the programmable circuits 300a-d, are described below in conjunction with FIGS. 4-5. Other configurations of the processing subsystems, memory subsystems, and communication channel are possible as well, beyond that depicted in FIG. 3. For example, certain memory subsystems may be directly controlled by one or more of the processing subsystems, such as in the case of a dedicated cache memory. Additional memory or system components can be included within the programmable circuit as well. Consequently, various additional data containment hierarchies may be implemented in the multiprocessing system as well.

FIG. 4 is a block diagram of a cell 400 in a computing environment. The cell 400 can correspond, for example, to a portion of a programmable circuit 300a-d of FIG. 3. The cell 400 includes a programmable circuit 402, a root complex 404, and a memory 406. The programmable circuit 402 executes program instructions stored in the memory 406 or other memory of the computing environment. The programmable circuit 402 can include execution units, cache memory, register memory and other functional blocks configured to assist in executing software resident in a software layer of the generalized computing architecture of FIG. 2. In one embodiment, the programmable circuit 402 is a general purpose central processing unit; other programmable circuits are possible as well.

The root complex 404 is communicatively connected to the programmable circuit 402, and provides the starting point for the communication channel. The root complex 404 provides a hierarchy of communication interfaces. In the embodiment shown, the root complex 404 is a PCI Express compatible device configured to route peer-to-peer transactions between various domains (i.e. from endpoint to endpoint). The communicative connection between the root complex 404 and the programmable circuit 402 can be a proprietary communication standard, or can be a standard data communication channel standard such as a PCI Express channel as well.

The memory 406 generally refers to at least a portion of unified memory structure with which the programmable circuit 402 is associated. The memory 406 can be a cache memory, system memory, or other types of data storage. The memory 406 generally is configured to store data alongside a plurality of status bits including at least a bit indicating whether the data at each memory location is good or "poisoned", meaning that a component in the cell 400 recognized that data to be erroneous.

The cell 400 also includes one or more endpoints 408a-e. Endpoints 408a-e refer to types of devices that can be the source or destination of a transaction along a communication link, such as a PCI Express communication link. Examples of endpoints can include a graphics controller and a communication controller, peripheral and I/O cards, or other devices. The endpoints may communicatively connect directly to the root complex 404 (e.g. endpoint 408a), or may alternatively connect to other intermediate components such as a switch 410 (e.g. endpoints 408b-e).

As shown, a switch 410 is communicatively connected to the root complex 404 by a communication channel, such as a PCI Express link. The switch 410 connects to endpoints 408b-e, and routes transactions among two or more systems connectable by a communications channel, such as a PCI Express link. In the embodiment shown, the switch 410 interconnects the root complex 404 with endpoints 408b-e, and routes transaction packets among the endpoints 408b-e and to the root complex 404. Other interconnections are possible as well, including more or fewer endpoints connected among the root complex 404 and the switch 410.

A bridge 412 interconnects the root complex 404 and one or more additional devices 414a-c. The devices 414a-c may in turn communicate with the root complex 404, memory 406, and programmable circuit 402. The additional devices 414a-c can be any of a number of types of computing system components operating using a same or different type of communication channel as the standardized channel implemented by the root complex 404. For example, the bridge 412 may be connected to the root complex 404 by a PCI Express link, while the various devices 414a-c connect to the bridge 412 by either a PCI Express link or a legacy PCI link. Other configurations are possible as well.

FIG. 5 is a block diagram of a root complex 500. The root complex 500 illustrates one possible embodiment of the root complex 404 of FIG. 4. The root complex 500 includes a plurality of link cores 502a-d, a transaction layer module 504, a protocol module 506, and control logic 508. Other components may be included in the root complex 500 as well.

Within the cell 400, the methods and systems for containing data errors may, for example, be embodied in the root complex 404. In such a system, the root complex could receive data from an endpoint, such as endpoint 408a. The root complex 404 would determine that the data received included an error which cannot be corrected, and would subsequently cease processing transactions received from that endpoint. In the case that the endpoint generating an error is one of the endpoints 408b-c connected to the root complex 404 by the switch 410, either data from the endpoint is separated from the data transmitted between the root complex 404 and switch 410, or all data received from the switch 410 is ignored by the root complex 404. Other implementations are possible as well.

The plurality of link cores 502a-d coordinate transmission and receipt of data on a physical bus linking the root complex 500 to downstream devices. For example, the plurality of link cores 502a-d provide interconnection to external systems, such as the endpoints 408a-e, switch 410, and bridge 412 of FIG. 4. The link cores 502a-d operate at the speed of the communication channel, which, in the embodiment shown, is a PCI Express interface.

The transaction layer module 504 receives, decodes and routes transaction packets received from the link cores 502a-d to the protocol module 506. The transaction layer module 504 includes a plurality of link logic cores 505a-d, which communicatively interconnect with the link cores 502a-d to receive data from communication channels associated with those link cores 502a-d, respectively. The transaction layer module 504 is generally configured to manage inbound and outbound data transfers between a system, such as a system memory or microprocessor and associated cache as described above, and a data communication channel, such as a PCI Express or other serial data communication channel. Additional functionality, such as buffering, error detection and correction, or transaction monitoring, can be performed in the transaction layer module 504 as well.

The protocol module 506 interfaces with additional system components (not shown) within the root complex 500 to pass decoded transactions to/from appropriate portions of a programmable circuit or memory interfaced to the root complex 500. The protocol module 506 transmits data which is now separated from the transaction packet in which it was received and is routed to an appropriate location for further processing. For example, the protocol module 506 can route inbound cache writes to a central processing unit, or inbound memory writes to a system memory, or both. Other transactions may be received at the root complex and distributed as well.

The control logic 508 provides appropriate control and tracking signals for sending and receiving transaction packets on one or more communication channels, or links, connected to the link cores 502a-d. The control logic 508 assists with routing transaction packets through the transaction layer module 504 and protocol module 506 for distribution within other portions of the system interfaced with the root complex 500. The control logic 508 includes tracking information used to monitor initialization and completion of operations transmitted through the root complex 500, such as indicating the completion of memory or cache read/write operations. Other transactions passed to or through the root complex 500 are tracked by the control logic 508 as well.

Figure 6:
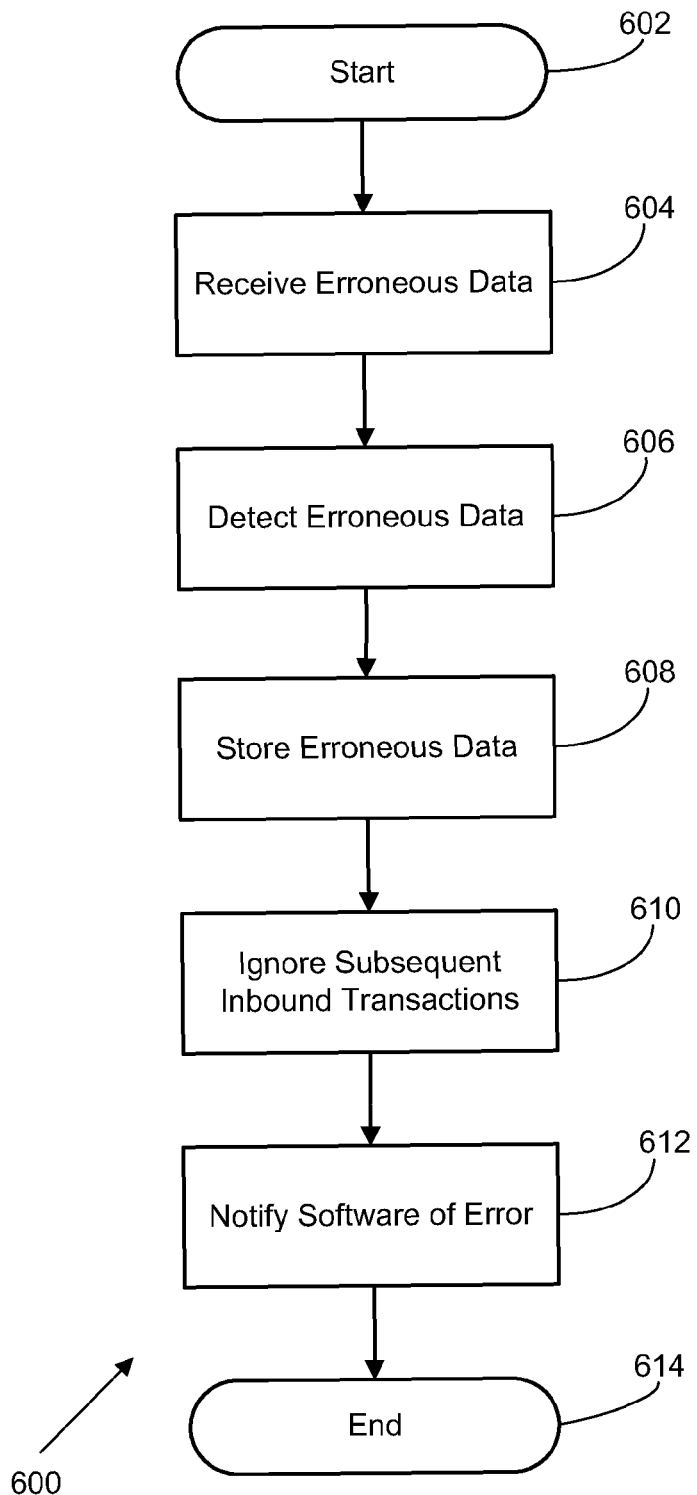
FIG. 6 is a flowchart of methods and systems for containing data errors in a computing system according to a further possible embodiment of the present disclosure.

FIG. 6 is a flowchart of methods and systems for containing data errors in a computing system according to a further possible embodiment of the present disclosure. The system 600 generally relates to detection and isolation of errors at a communication interface. One embodiment of the system 600 is operable in a multiple communication channel computing system implementing the PCI Express communications protocol and infrastructure, such as is shown above in conjunction with FIGS. 3-5. In such an embodiment, the endpoints include PCI Express compatible communication interfaces, and the system 600 may execute within a root complex of the computing hardware. Other systems, structures, and protocols are possible as well.

The system is instantiated at a start operation 602, which relates generally to operation of a communication interface. In various embodiments, the start operation corresponds to initialization of a communication interface, such as a PCI interface (e.g. PCI, PCI Express, PCI-X). The start operation 602 can specifically relate to transmission of a data request from a communication interface to an endpoint having a complementary communication interface.

Operational flow proceeds to a data receipt module 604. The data receipt module 604 corresponds to the module 104 of FIG. 1, and, in general, receives data from an endpoint transmitted on a communication channel. The data received may be instruction or address data received in response to a read request transmitted from the communication interface, or may be data targeted to systems interconnected with the communication interface, such as a memory subsystem or programmable circuit. In one embodiment, the data receipt module 604 receives data into a register in a communication interface. Other implementations are possible as well.

Operational flow proceeds to an error detection module 606. The error detection module 606 generally corresponds to the module 106 of FIG. 1 in that it is configured to detect errors in the data received in the data receipt module 604. The error detection module 606 performs an error detection operation on received transaction packets on the communication channel. In one embodiment, the error detection module 606 executes within an error detection and correction module of the transaction layer module 504. Alternately, the error detection module 606 may execute in an alternative location within the transaction layer module 504, or may operate on the data itself within the protocol module 506 of FIG. 5. Other implementations or locations of the error detection module 606 are possible as well.

Operational flow proceeds to a storage module 608. The storage module 608 stores the erroneous data into memory of a computing system, such as system memory or a cache memory location, or both. The storage module 608 optionally stores a "poison" bit alongside the data in memory, to indicate that the data includes errors. Other implementations indicating to a system reading the data that the data is erroneous are possible as well. In one possible embodiment, the storage module 608 is performed in a manner analogous to an inbound write transaction, with the data being written to memory according to the dataflow of the systems described above in conjunction with FIGS. 3-5.

Operational flow proceeds to a subsequent transaction module 610. The subsequent transaction module 610 "ignores" transaction packets that are received at the communication interface after the transaction packet containing erroneous data. The subsequent transaction module 610 isolates the endpoint providing erroneous data to the communication interface in the root complex by preventing transmission and completion of subsequent transaction packets received. A number of implementations are possible to determine which subsequent transactions are to be ignored, based on the identity of the endpoint, the communication channel or "link" to which the endpoint is connected, and the type of connection used in conjunction with the endpoint. Each of these implementations may differ in the extent and thoroughness of the isolation.

In a first embodiment, the subsequent transaction module 610 ignores all subsequent transactions on the communication channel to which the endpoint is connected, effectively ignoring the endpoint and all other inbound communications to the communication interface on that communication channel. In such an embodiment, the communication interface will halt processing any transaction packets received from other endpoints using the same communication channel.

In a second embodiment, the subsequent transaction module 610 ignores only the subsequent transactions on the communication channel that are identified as generated by the same endpoint as the erroneous data. In such an embodiment, the communication interface will continue to process transaction packets received from other endpoints using the same communication channel.

In a further embodiment in which the communication interface is a PCI interface, the subsequent transaction module 610 postpones all Message Signalled Interrupts (MSI) sourced from the endpoint. In such an embodiment, all completion interrupts are halted, preventing the system from ever recognizing a completed transaction sourced from the endpoint causing the error. In this embodiment, it is assumed that all endpoints within the system use MSI rather than some other interrupt mechanism.

Operational flow proceeds to a notification module 612. The notification module 612 notifies a software layer that an error has been received at a communication interface associated with the programmable circuit upon which the software layer executes. In one embodiment, the notification module 612 corresponds to writing the address of the erroneous, or "poisoned", data into a register polled by one or more pieces of software. In a further embodiment, the notification module 612 corresponds to setting a hardware flag, thereby triggering an interrupt in an operating system or driver indicating that a data error has occurred.

Operational flow terminates at an end operation 614, which corresponds to the hardware having completed performance of the various tasks required of it to contain the data error received by the root complex, e.g. at a PCI Express communication interface.

Figure 7:
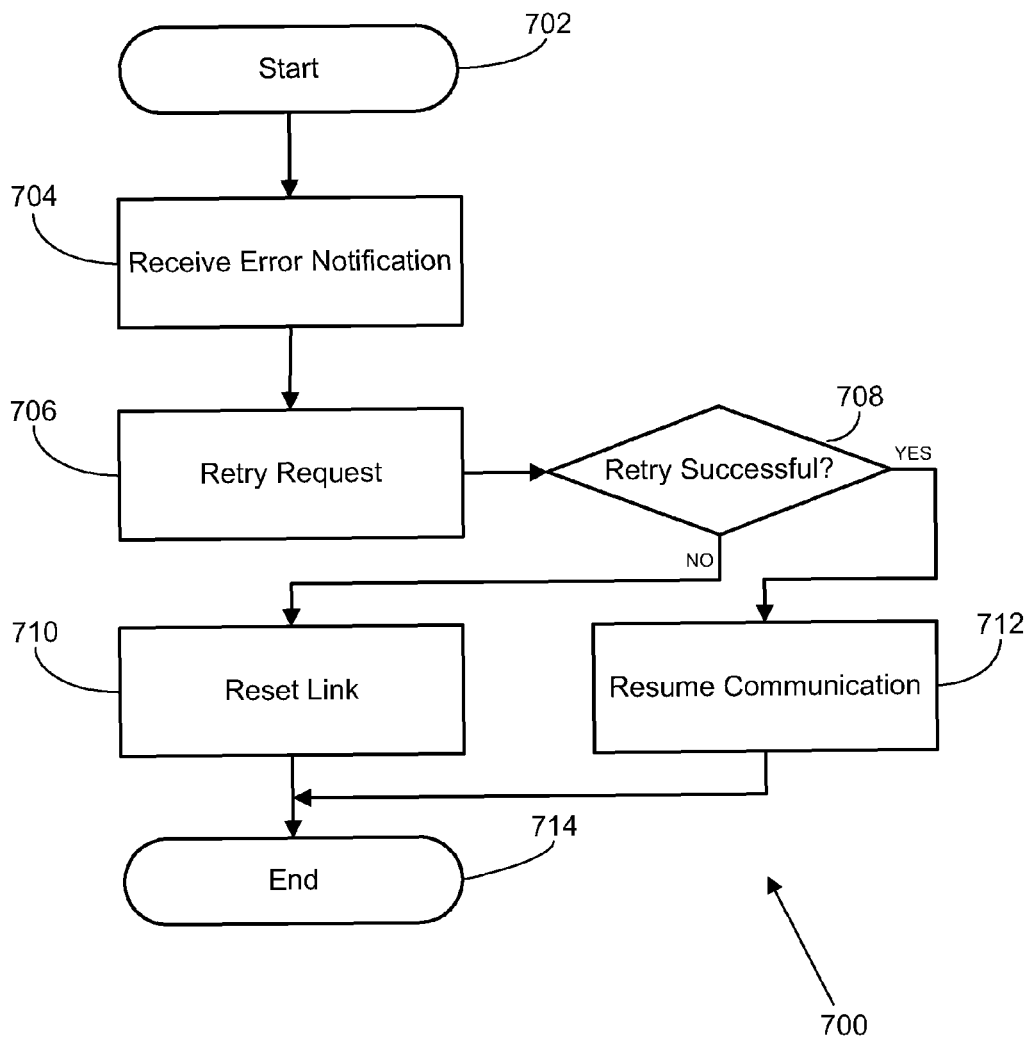
FIG. 7 is a flowchart of methods and systems for restoring system operation useable in conjunction with the systems and methods of FIG. 6.

Referring now to FIG. 7, a flowchart of methods and systems for restoring system operation is shown. Various embodiments of the system 700 are useable in conjunction with the systems and methods for containing data errors as described above in conjunction with FIG. 6. In certain embodiments, the system 700 is embodied in a software layer, such as the software layer 206 of FIG. 2. Operational flow within the system 700 is instantiated at a start operation 702.

Operational flow proceeds to an error receipt module 704. The error receipt module 714 receives a notification in a software layer that an error has been received by a communication interface, such as a PCI Express link interface integrated into a root complex, as shown in FIGS. 4-5. The error receipt module 704 operates within a software layer, such as in one or more drivers and/or an operating system operating on a programmable circuit as described above in FIGS. 2-3. In one embodiment, the error receipt module 704 corresponds to reading a register populated by the address of the erroneous, or "poisoned", data. In a further embodiment, the error receipt module 704 corresponds to loss of contact with the endpoint, such as in an instance caused by the subsequent transaction module 610 of FIG. 6, triggering an interrupt in an operating system or driver indicating that a data error has occurred. In yet a further embodiment, the error receipt module 704 corresponds to receiving an indication in software that a hardware flag has been set, such as by the notification module 612 of FIG. 6. Other implementations of the error receipt module 704 are possible as well.

Operational flow proceeds to a retry module 706. The retry module 706 corresponds to the software layer triggering the communication interface to retry the transaction which caused receipt of erroneous data at the communication interface. For example, if the triggering transaction was a read request of data at an endpoint communicatively connected to the interface, the read request is retried, and the resulting data is again checked for an error, such as by an error detection and correction module in the communication interface hardware. Other transactions may be retried as well, such as retried write transactions which received erroneous confirmation data, or other transactions.

Operational flow proceeds to a retry evaluation module 708. The retry evaluation module 708 determines the success or failure of the retry request performed by the retry module 706. In one embodiment, the retry evaluation module 708 detects successfully received non-erroneous replacement data at the communication interface. In a further embodiment, the retry evaluation module 708 detects successful completion of the transaction retried by the retry module. Other evaluation methodologies are possible as well. If the retry operation was unsuccessful as determined by the retry evaluation module 708, operational flow branches "no" to a reset module 710. If the retry operation was successful as determined by the retry evaluation module 708, operational flow branches "yes" to a resume module 712.

The reset module 710 and the resume module 712 provide software layer operations related to the instances in which the retry module 706 either does not or does complete successfully. The reset module 710 executes in the instance in which retrying the transaction is not successful. The reset module 710 operates within the software layer to shut down and restart a portion of the system in which the error was occurred. In one embodiment, the reset module 710 resets the communication link or channel between the communication interface (e.g. an interface within the root complex) and the endpoint. In another embodiment, the reset module only resets the endpoint, leaving the remaining components connected to the communication channel to be unaffected. The resume module 712 executes in the instance in which retrying the transaction is successful. The resume module 712 allows normal communication with the endpoint via the link connecting the communication interface to the endpoint. The resume module 712 generally resumes communication with the endpoint by reversing the operation of the subsequent transaction module 610 of FIG. 6, due to the fact that the retried transaction was later successfully completed.

Operational flow terminates at an end operation 714 from both the reset module 710 and the resume module 712. The end operation 714 completes the software layer recovery following the data containment process of FIG. 6, either by indicating that a hardware link is reset, or by successfully retrying the erroneous transaction.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The invention claimed is:

1. A method for containing data errors in a computing system, the method comprising:
   receiving data from an endpoint at the communication interface in response to a data request;
   detecting an error in the data;
   ignoring subsequent data received from the endpoint; and
   rerouting data addressed to the endpoint to a secondary endpoint.

2. The method of claim 1, further comprising transmitting a data request from the communication interface to the endpoint.

3. The method of claim 1, further comprising reporting the error to software that is using the endpoint.

4. The method of claim 3, wherein the software includes a driver.

5. The method of claim 3, wherein the software is an operating system.

6. The method of claim 3, further comprising retrying the data request.

7. The method of claim 1, further comprising reestablishing the connection to the endpoint.

8. The method of claim 7, wherein reestablishing the connection to the endpoint comprises resetting a link in a PCI express interface.

9. The method of claim 1, further comprising writing the data into a memory.

10. The method of claim 9, further comprising storing the address of the data.

11. The method of claim 1, wherein ignoring subsequent data received from the endpoint comprising halting all message signaled interrupts relating to the endpoint.

12. The method of claim 1, wherein ignoring subsequent data received from the endpoint comprises ignoring all data received on a communication channel associated with the endpoint.

13. The method of claim 1, wherein the communication interface is a PCI Express interface.

14. The method of claim 1, wherein the endpoint and the secondary endpoint are the same type of device.

15. A computing system comprising:
    a memory configured to store data;
    a programmable circuit operatively connected to the memory and configured to execute program instructions; and
    a communication interface operatively connected to the programmable circuit and the memory, the communication interface configured to:
       receive data from an endpoint in response to a data request; detect an error in the data;
       store the data in the memory;
       ignore subsequent data received from the endpoint; and
       reroute data addressed to the endpoint to a secondary endpoint.

16. The computing system of claim 15, wherein the communication interface is further configured to transmit the data request to the endpoint.

17. The computing system of claim 15, wherein the communication interface the error to software that is using the endpoint.

18. The computing system of claim 17, wherein the software includes a driver.

19. The computing system of claim 15, wherein the software is an operating system.

20. The computing system of claim 15, wherein the communication interface is a PCI Express interface.

21. The computing system of claim 15, wherein the communication interface is further configured to write the data into the memory.

22. The computing system of claim 21, wherein the communication interface is further configured to store the address of the data.

23. The computing system of claim 15, wherein the communication interface is further configured to retry the data request.

24. The computing system of claim 15, wherein the communication interface is further configured to halt all message signaled interrupts relating to the endpoint.

25. The computing system of claim 15, wherein the communication interface is further configured to ignore all data received on a communication channel associated with the endpoint.

* * * * *